Patented Dec. 9, 1924.

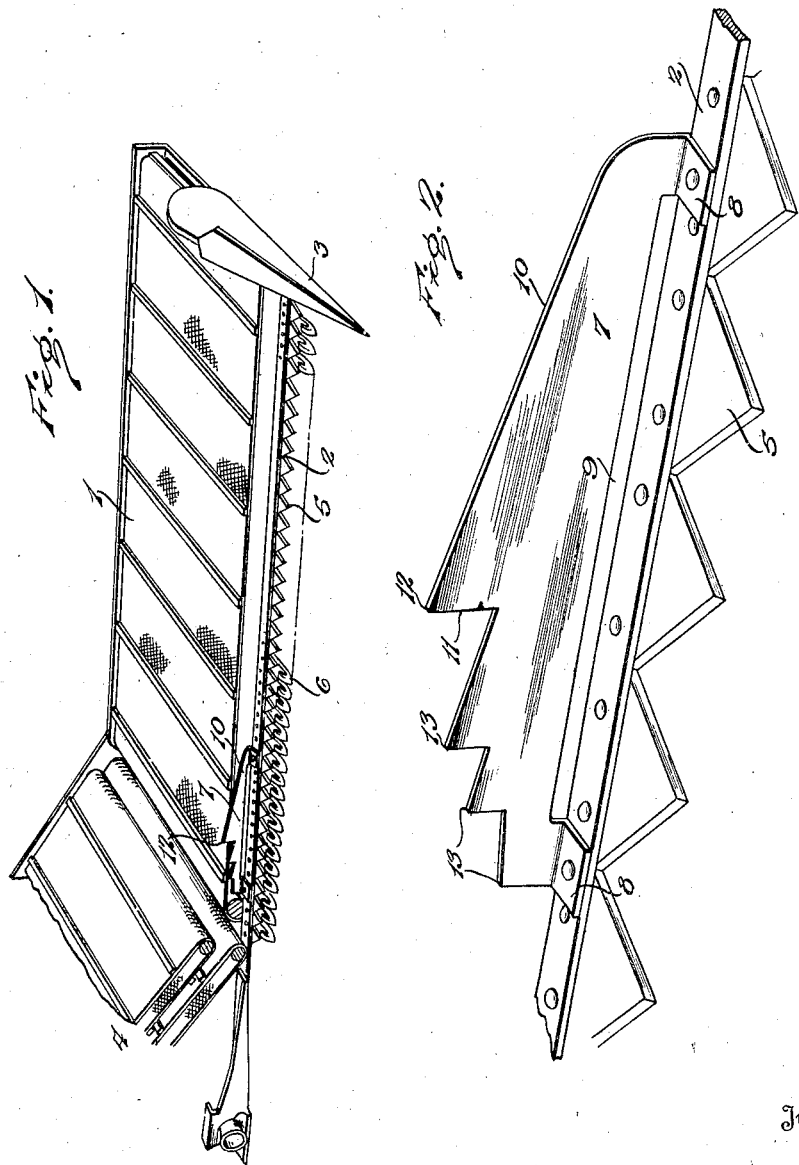

1,518,813

UNITED STATES PATENT OFFICE.

PHILIPP ORTH, OF SCOTLAND, SOUTH DAKOTA, ASSIGNOR TO ARTHUR TREICK, OF SCOTLAND, SOUTH DAKOTA.

ATTACHMENT FOR HARVESTERS.

Application filed April 25, 1924. Serial No. 708,949.

*To all whom it may concern:*

Be it known that I, PHILIPP ORTH, a citizen of the United States, residing at Scotland, in the county of Bon Homme and State of South Dakota, have invented certain new and useful Improvements in Attachments for Harvesters, of which the following is a specification.

This invention is an attachment for harvesters, mowers and like machines whereby the stalks of the cut grain will be arranged evenly upon the conveyer and clogging of the machine thereby avoided. In the operation of harvesters, the reel beats the standing grain over toward the platform conveyer whereby it is intended to fall upon said conveyer evenly and transversely thereto as it is cut by the knives. Unless the grain is standing upright, however, it is apt to fall upon the platform conveyer unevenly and frequently in a more or less tangled mass and carry with it grass, weeds and other foreign matter. As a result of this condition, the weeds, grass and other foreign matter tend to accumulate at the point where the grain is transferred from the platform conveyer to the elevating conveyers and choke the operation of the machine. Moreover, the stalks are presented to the binder in such condition that the butt ends of some stalks are commingled with the heads of succeeding stalks so that they are bound into succeeding bundles, and most binders are provided with attachments for arranging the butt ends of the stalks evenly in the bound bundles. These attachments, however, fail to function properly when the stalks are tangled, as just stated. It is, therefore, the object of my invention to provide a simple and inexpensive device which may be applied to the cutter bar without necessitating any change in the construction or operation of the same and which will operate efficiently to separate the butt ends of the stalks so that they will be arranged evenly upon the platform conveyer and the grass and trash will be permitted to fall onto the ground. This object is attained in such a device as is illustrated in the accompanying drawing, and the invention resides in certain novel features which will be hereinafter fully set forth.

In the drawing:

Figure 1 is a perspective view of so much of the cutting mechanism and the conveying mechanism of a harvester as is needed to disclose my invention, and Fig. 2 is an enlarged detail perspective view of the attachment.

The platform conveyer 1 may be of the usual or any preferred construction and the cutter bar 2 is mounted to operate in the usual manner at the front of said conveyer. At one end of the platform conveyer is the usual divider 3, and at the opposite end thereof the usual elevating conveyers 4 are provided. The cutter bar 2 carries knives 5 working through guard fingers 6, as will be readily understood by those skilled in the art.

In carrying out my invention, I employ a butt-evener plate 7 which is provided at the ends of one longitudinal edge with lips or flanges 8 offset from the plate at a right angle thereto and spaced vertically from the edge of the plate to provide an elongated opening 9 between the plate and the cutter bar, as shown most clearly in Fig. 2. The upper longitudinal edge of the butt-evener plate presents the obliquely disposed or inclined portion 10 having its lowest point arranged away from the elevators so that, as the knife moves outwardly or toward the divider 3, the evener plate may ride readily under the butts of the stalks and impart a slight upward movement thereto whereby they will be sufficiently agitated to effect a separation of weeds and trash therefrom. The butt evener plate may be of any preferred length, but I have found that it is sufficient if the plate be approximately of the proportions illustrated. At the high end of the edge portion 10, the upper edge of the evener plate extends sharply downward, as at 11, defining a tooth 12, and extending from said tooth inwardly, or toward the driving pitman and elevator, the edge of the plate extends generally downwardly. This downwardly and inwardly extending portion of the edge is interrupted to present teeth 13 in stepped relation, the innermost and lowest tooth being at the inner end of the plate, which are adapted to positively engage the projecting butt ends of the stalks with any trash clinging thereto and feed the same toward the elevator.

It is clear from an inspection of the drawing that the butt evener plate will reciprocate with the cutter and the cutter bar. The speed of the cutter and the cutter bar is some-what greater than the speed of the platform conveyer 1 and, as a result of these different rates of travel, as the cutter moves toward the elevator, the evener plate will engage the butts of the stalks and carry them forward slightly in excess of the rate at which the heads of the stalks are carried by the conveyer so that the butt ends of the stalks, which normally tend to drag behind the heads, will be spread evenly over the conveyer and will be transferred to the elevator uniformly and without being tangled with each other. The jogging agitation of the butts caused by this engagement of the evener plate will separate the trash from the stalks so that the trash may drop to the ground between the front edge of the conveyer and the rear edge of the cutter bar and the finger bar. Any dirt which might tend to accumulate upon the cutter bar will be permitted to escape through the space 9 between the cutter bar and the lower edge of the evener plate, as is obvious. The teeth effect a positive engagement with the butt ends of the stalks and, therefore, will very efficiently feed them forward toward the elevator. Moreover, if weeds, grass and trash should tend to accumulate at the lower end of the elevator and choke the operation, these teeth will cut into the accumulation and free the same from the surrounding structure so that they will at once fall to the ground and the grain will pass to the binder clean and free of foreign matter. The evener plate is secured upon the upper side of the cutter bar and obviously requires no change in the construction of the same. It may be riveted to the cutter bar so as to be permanently mounted thereon or it may be secured by removable bolts so that it may be set aside when operation of the harvester without the evener plate is feasible. The butt evener plate may be constructed of any strong light metal so that it will not add perceptibly to the weight to be driven by the pitman and, therefore, will not lessen the efficiency of the machine but, on the contrary, will increase its effectiveness. The stepped relation of the teeth 13 imparts a tapered formation to the inner portion of the plate which permits it to ride easily under the projecting butt ends of the stalks and to closely approach the elevator when the latter overhangs the conveyer.

Having thus described the invention, what I claim is:

A butt evener plate for attachment to the cutter bars of harvesters or like machines comprising a plate adapted to be set on edge, and angular extensions projecting from the lower edge of the plate to be secured upon a cutter bar and maintain the lower edge of the plate in vertically spaced relation to the cutter bar, the upper edge of the plate being inclined toward its ends and presenting an inwardly projecting tooth at its highest point and a stepped series of teeth each extending relatively further inwardly than the one immediately preceding between said point and its inner end.

In testimony whereof I affix my signature.

PHILIPP ORTH.